(12) United States Patent
Collison et al.

(10) Patent No.: US 12,297,640 B2
(45) Date of Patent: *May 13, 2025

(54) FIBER BOARD PROVIDING RIGIDITY, SOUND REDUCTION, AND THERMAL INSULATION

(71) Applicant: MP Global Products, L.L.C., Norfolk, NE (US)

(72) Inventors: Alan B. Collison, Pierce, NE (US); Reid Borgman, Norfolk, NE (US); Dylan Pospisil, Battle Creek, NE (US); Carl Fuelberth, Norfolk, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,278

(22) Filed: Aug. 2, 2024

(65) Prior Publication Data

US 2024/0392560 A1    Nov. 28, 2024

Related U.S. Application Data (63) Continuation-in-part of application No. 18/100,838, filed on Jan. 24, 2023, now Pat. No. 12,077,969.

(Continued)

(51) Int. Cl.
| | | |
|---|---|---|
| E04B 5/00 | (2006.01) | |
| B32B 5/02 | (2006.01) | |
| B32B 5/18 | (2006.01) | |
| B32B 5/24 | (2006.01) | |
| B32B 7/12 | (2006.01) | |
| B32B 15/04 | (2006.01) | |
| B32B 15/14 | (2006.01) | |

(Continued)

(52) U.S. Cl.
CPC ............... *E04B 1/90* (2013.01); *B32B 5/024* (2013.01); *B32B 5/18* (2013.01); *B32B 5/245* (2013.01); *B32B 7/12* (2013.01); *B32B 15/046* (2013.01); *B32B 15/14* (2013.01); *B32B 15/20* (2013.01); *B32B 2260/021* (2013.01); *B32B 2260/046* (2013.01); *B32B 2262/0253* (2013.01); *B32B 2262/0261* (2013.01); *B32B 2262/0284* (2013.01); *B32B 2266/025* (2013.01); *B32B 2307/304* (2013.01); *B32B 2307/3065* (2013.01); *B32B 2471/00* (2013.01); *B32B 2607/00* (2013.01)

(58) Field of Classification Search
CPC ........... B32B 5/024; B32B 5/18; B32B 15/14; E04B 1/90
See application file for complete search history.

(56) References Cited

U.S. PATENT DOCUMENTS

| | | | | |
|---|---|---|---|---|
| 5,607,414 A | * | 3/1997 | Richards ............... | A61F 13/539 604/370 |
| 8,530,548 B2 | * | 9/2013 | Hansen ................... | C08J 5/045 524/35 |

(Continued)

*Primary Examiner* — Basil S Katcheves
(74) *Attorney, Agent, or Firm* — Harness, Dickey & Pierce, P.L.C.

(57) ABSTRACT

A fiber board for a building structure is disclosed. The fiber board includes a fiber structure. The fiber structure includes a substrate fiber and a thermoplastic binder fiber. The substrate fiber is bound together by the thermoplastic binder fiber. The thermoplastic binder fiber makes up between 25 percent (%) and 35% by weight of the fiber board.

21 Claims, 4 Drawing Sheets

Related U.S. Application Data

(60) Provisional application No. 63/304,421, filed on Jan. 28, 2022.

(51) Int. Cl.
  *B32B 15/20* (2006.01)
  *E04B 1/90* (2006.01)

(56) References Cited

U.S. PATENT DOCUMENTS

| | | |
|---|---|---|
| 11,447,962 B2 | 9/2022 | Collison |
| 12,077,969 B2 * | 9/2024 | Collison ............... B32B 5/08 |
| 2002/0151634 A1 * | 10/2002 | Rohrbaugh ........... D06M 10/00 |
| | | 524/492 |
| 2011/0061794 A1 * | 3/2011 | Song ..................... E04B 1/78 |
| | | 156/229 |
| 2011/0250386 A1 * | 10/2011 | Gonsior ................ E04B 1/80 |
| | | 156/253 |
| 2012/0308795 A1 | 12/2012 | Hauber et al. |
| 2014/0127451 A1 | 5/2014 | Pilpel et al. |
| 2017/0362837 A1 | 12/2017 | Shugg et al. |
| 2019/0383032 A1 * | 12/2019 | Hascher ................ B32B 5/26 |

* cited by examiner

FIBER BOARD PROVIDING RIGIDITY, SOUND REDUCTION, AND THERMAL INSULATION

CROSS-REFERENCE TO RELATED APPLICATIONS

This application is a continuation-in-part application of U.S. application Ser. No. 18/100,838, filed on Jan. 24, 2024, which claims the benefit of U.S. Provisional Application No. 63/304,421, filed on Jan. 28, 2022. The entire disclosures of the above applications are incorporated herein by reference.

FIELD

The present disclosure relates to fiber boards providing rigidity, sound reduction, and thermal insulation.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A building structure, such as a floor, a wall, a ceiling, etc., may include multiple layers or coverings. A covering is a top or finished layer of a building structure. Many coverings are used today including wood, laminate, tile, drywall, etc. In some cases, for example when the building structure is a floor, a thicker floor covering is replaced by a thinner floor covering, which yields a gap between the thinner floor covering and wall trim disposed above the thinner floor covering. The thinner floor covering can also yield a trip hazard at the transition between the thinner floor covering and adjacent, thicker floor covering that has not been replaced.

A floor lift layer is placed between a thinner floor covering and a subfloor to eliminate a gap between the thinner floor covering and wall trim. Floor lift layers are typically made of plywood, cork, or rubber, and are therefore heavy and provide minimal sound reduction and thermal insulation. Conventional floor lift layers may not achieve a desired fire rating.

SUMMARY

This section provides a general summary of the disclosure, and is not a comprehensive disclosure of its full scope or all of its features.

An example of a fiber board for a building structure according to the present disclosure includes a fiber structure. The fiber structure includes a substrate fiber and a thermoplastic binder fiber. The substrate fiber is bound together by the thermoplastic binder fiber. The thermoplastic binder fiber makes up between 25 percent (%) and 35% by weight of the fiber board.

In one aspect, the substrate fiber includes polyethylene terephthalate (PET) fiber, polypropylene (PP) fiber, nylon fiber, paper fiber, or combinations thereof.

In one aspect, the substrate fiber includes short PET fiber having a length within a range from 2 millimeters (mm) to 10 mm and long PET fiber having a length within a range from 10 mm to 20 mm.

In one aspect, the substrate fiber further includes polypropylene fiber and nylon fiber.

In one aspect, the substrate fiber includes between 43% and 53% by weight of the short PET fiber.

In one aspect, the thermoplastic binder fiber is a bicomponent fiber with a polypropylene core and a polyethylene sheath surrounding the polypropylene core.

In one aspect, the fiber board further includes a thermal radiant barrier attached to a surface of the fiber structure.

In one aspect, the thermal radiant barrier includes a foam layer disposed on the surface of the fiber structure and a radiant barrier layer disposed on the foam layer. The radiant barrier layer includes a first metallic layer, a second metallic layer, and a fiber layer disposed between the first metallic layer and the second metallic layer.

In one aspect, the foam layer includes at least one of polyethylene (PE), ethylene-vinyl acetate (EVA), co-polymers thereof, or combinations thereof. Each of the first and second metallic layers includes aluminum. The fiber layer includes woven fibers that are coated with PE.

In one aspect, at least a portion of at least one of the substrate fiber and the thermoplastic binder fiber is treated with a fire-retardant coating. In one aspect, at least a portion of the substrate fiber includes fiber that is naturally a fire retardant.

In one aspect, a floor structure including the fiber board includes a subfloor and a floor covering disposed above the subfloor. The fiber board is disposed between the subfloor and the floor covering. The fiber board having at least one of (i) a top surface exposed to the floor covering and (ii) a bottom surface exposed to the subfloor.

In one aspect, a wall structure includes the fiber board, an insulation, and a wall covering disposed on an interior side of the insulation. The fiber board is disposed between the insulation and the wall covering.

A fiber board for a building structure according to the present disclosure includes a fiber structure and a thermal radiant barrier disposed on a surface of the fiber structure. The fiber structure includes a substrate fiber and a thermoplastic fiber. The substrate fiber is bound together by the thermoplastic binder fiber. The thermal radiant barrier includes a foam layer disposed on the surface of the fiber structure and a radiant barrier disposed on the foam layer.

In one aspect, the foam layer includes at least one of PE, EVA, co-polymers thereof, or combinations thereof.

In one aspect, the radiant barrier layer incudes a first metallic layer, a second metallic layer, and a fiber layer disposed between the first metallic layer and the second metallic layer.

In one aspect, the radiant barrier layer further includes a first adhesive layer disposed between the first metallic layer and the fiber layer and a second adhesive layer disposed between the fiber layer and the second metallic layer.

In one aspect, each of the first and second metallic layers include aluminum.

In one aspect, the fibers of the fiber layer are woven.

In one aspect, fibers of the fiber layer include polymeric material, hemp, rayon, cotton, natural fibers, banana plant leaf, or combinations thereof, and the fibers are coated with PE.

An example of a fiber board for a building structure according to the present disclosure includes a fiber structure. The fiber structure includes a substrate fiber and a thermoplastic binder fiber. A fire-retardant coating is applied to at least one of the substrate fiber and the thermoplastic fiber.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
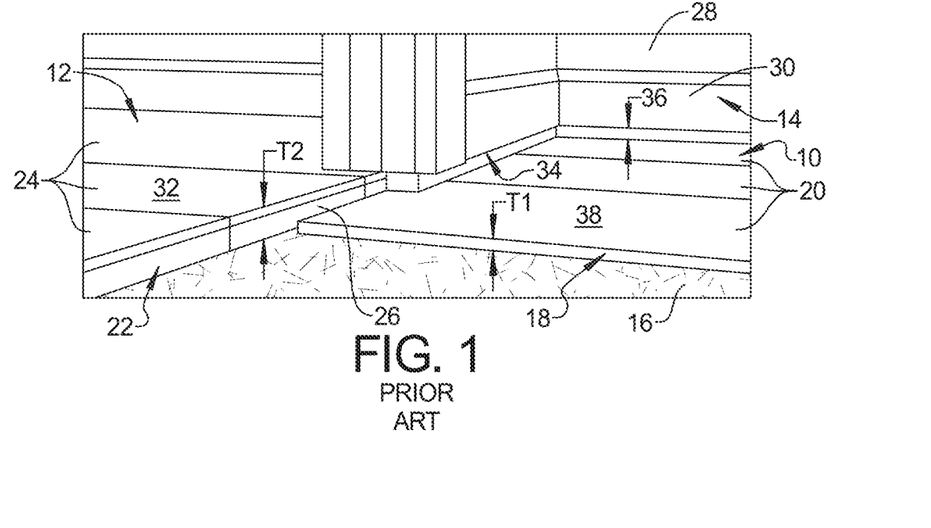
FIG. 1 is a partially sectioned perspective view of a floor structure according to the prior art including a thin floor covering that yields a large gap between wall trim and the floor structure.

Referring now to FIG. 1, a floor structure 10 according to the prior art is shown adjacent to another floor structure 12 and a wall structure 14. The floor structure 10 includes a subfloor 16 and a floor covering 18 disposed over the subfloor 16. The subfloor 16 includes sheets of plywood. The floor covering 18 includes engineered hardwood or laminate planks 20 having a thickness T1.

The floor structure 12 includes the subfloor 16 and a floor covering 22 disposed over the subfloor 16. In one example, the floor covering 22 of the floor structure 12 is similar or identical to a floor covering replaced by the floor covering 18 of the floor structure 10. The floor covering 22 includes natural hardwood planks 24 having a thickness T2. The thickness T2 of the floor covering 22 is greater than the thickness T1 of the floor covering 18, which exposes a side surface 26 of the floor covering 22. The exposed side surface 26 of the floor covering 22 creates a trip hazard for individuals transitioning from walking on the floor covering 18 to walking on the floor covering 22.

The wall structure 14 includes a wall covering 28, such as drywall or plaster, and trim 30 disposed over the wall covering 28. The trim 30 may include pieces of natural wood. The trim 30 extends over the floor structure 10 and the floor structure 12, and the trim 30 seats flush on the floor covering 22 of the floor structure 12 with little to no gap between a top surface 32 of the floor covering 22 and a bottom surface 34 of the trim 30. However, since the thickness T2 of the floor covering 22 is greater than the thickness T1 of the floor covering 18, there is a gap 36 between a top surface 38 of the floor covering 18 and the bottom surface 34 of the trim 30. The gap 36 is aesthetically displeasing.

Figure 2:
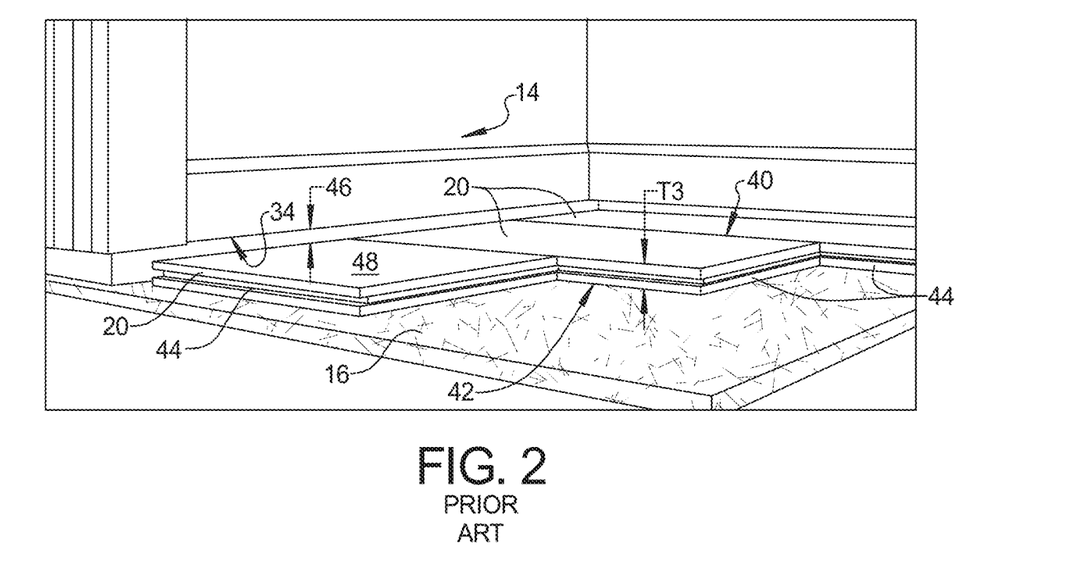
FIG. 2 is a partially sectioned perspective view of another floor structure according to the prior art including a thin floor covering with a backing that yields a small gap between wall trim and the floor structure.

Referring now to FIG. 2, another floor structure 40 according to the prior art is shown adjacent to the wall structure 14. The floor structure 40 includes the subfloor 16 and a floor covering 42 disposed over the subfloor 16. The floor covering 42 includes the planks 20 and a backing 44 attached to the underside surfaces of the planks 20. The backing 44 is includes layers of plywood and may be referred to as a floor lift layer since it raises the height of the planks 20.

The planks 20 and the backing 44 collectively have a thickness T3 that is greater than the thickness T1 of the floor covering 18 of FIG. 1 and less than the thickness T2 of the floor covering 22 of FIG. 1. Thus, while there is a gap 46 between a top surface 48 of the floor covering 18 and the bottom surface 34 of the trim 30, the size of the gap 46 is less than the size of the gap 36 of FIG. 1. While the gap 46 may be eliminated by increasing the thickness of the backing 44, it is difficult to do so without causing an interference between the floor covering 42 and the trim 30 since plywood is supplied in standard thicknesses and is relatively incompressible.

Figure 3:
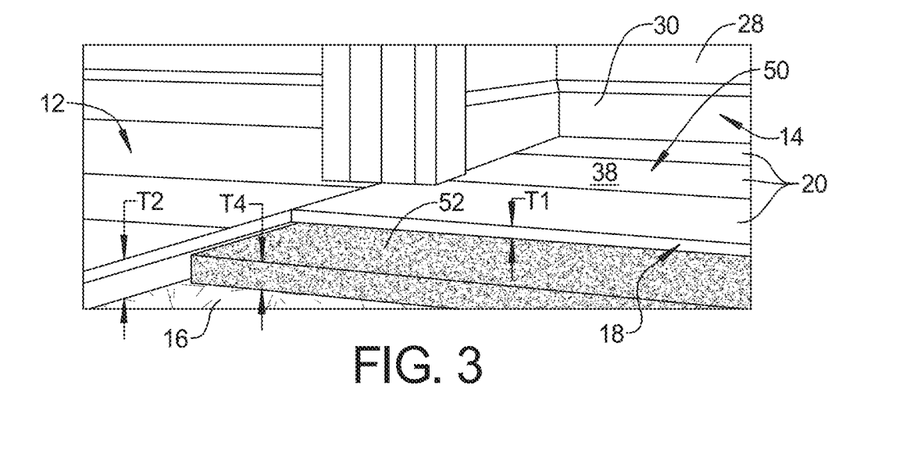
FIG. 3 is a partially sectioned perspective view of a floor structure according to the principles of the present disclosure including the thin floor covering of FIG. 1 and a floor lift layer that raises the floor covering to eliminate a gap between wall trim and the floor structure, the floor lift layer including a fiber board.

Referring now to FIG. 3, a floor structure 50 according to the present disclosure is shown adjacent to the floor structure 12 and the wall structure 14. The floor structure 50 includes the subfloor 16, the floor covering 18 disposed above the subfloor 16, and a floor lift layer 52 disposed between the subfloor 16 and the floor covering 18.

The floor lift layer 52 raises the height of the planks 20 of the floor covering 18 so that the trim 30 seats flush on the floor covering 18 of the floor structure 50 with little to no gap between the top surface 38 of the floor covering 18 and the bottom surface 34 of the trim 30.

The floor lift layer 52 has a thickness T4 that is, for example, within a range from ⅛ inch (in.) to ½ in. (e.g., ⅛ in., 3/16 in., ¼ in., 5/16 in., ⅜ in., 7/16 in., ½ in.). The sum of the thickness T4 of the floor lift layer 52 and the thickness T1 of the floor covering 18 is equal to the thickness T2 of the floor covering 22. Thus, in contrast to the floor structure 10 of FIG. 1, the side surface 26 of the floor covering 22 is not exposed, and therefore the floor structure 50 does not create a trip hazard.

The floor lift layer 52 provides rigidity, sound reduction, and thermal insulation and is lighter than conventional materials made of plywood, cork or rubber. The floor lift layer 52 is sufficiently rigid to enable placing it beneath most types of floor coverings without causing damage to the floor covering due to the floor lift layer 52 compressing under the pressure of normal use (e.g., the weight of person walking). Conversely, the floor lift layer 52 is more compressible than floor lift layers made of more rigid material such as plywood so that the floor lift layer 52 may be compressed to avoid an interference between the floor covering 42 and the trim 30. For example, if the combined thickness of the floor lift layer 52 and the floor covering 18 is greater than the size of the gap between the subfloor 16 and the trim 30, the floor lift layer 52 can be compressed to fit it and the floor covering 18 within that gap. This enables avoiding any gap between the floor covering 18 and the trim 30. In addition, the compressibility of the floor lift layer 52 yields less foot fatigue relative to floor lift layers made of harder material.

In one example, the floor lift layer 52 has a compression resistance within a range from 450 pounds per square inch (psi) at 50 percent (%) compression to 525 psi at 50% compression when tested according to American Society for Testing and Materials (ASTM) D3575. The compressibility of the floor lift layer 52 may be achieved through the density and/or weight of the floor lift layer 52. In one example, the floor lift layer 52 has a density within a range from 18 pounds per cubic feet (lb./ft$^3$) to 24 lb./ft$^3$. In other examples, the floor lift layer 52 has one of the following combinations of thickness and weight: (i) a thickness of ⅛ in. and a weight from 1500 grams per square meter (GSM) to 2000 GSM, (ii) a thickness of ¼ in. and a weight from 2000 GSM to 3000 GSM and (iii) a thickness of ½ in. and a weight from 4500 GSM to 5000 GSM.

The sound reduction and thermal insulation provided by the floor lift layer 52 is superior to that of floor lift layers made of plywood. In one example, the floor lift layer 52 has an impact insulation class (IIC) within a range from 55 to 80, a sound transmission class (STC) within a range from 52 to 75, and/or a delta IIC within a range from 22 to 28. In one example, the floor lift layer 52 has an R-value within a range from 0.6 to 0.9. The floor lift layer 52 may have an R-value within a range from 3.5 to 4 per inch. For example, the floor lift layer 52 may have one of the following combinations of thickness and R-value: (i) a thickness of ⅛ in. and an R-value within a range from 0.4 to 0.5, (ii) a thickness of ¼ in. and an R-value within a range from 0.875 to 1, and (iii) a thickness of ½ in. and an R-value within a range from 1.8 to 2. While the floor lift layer 52 is suitable for use with a floor covering having an underlayment backing, the sound reduction and thermal insulation provided by the floor lift layer 52 eliminates the need to use a floor underlayment between the floor covering and the floor lift layer 52.

The materials from which the floor lift layer 52 is made, and the way in which the floor lift layer 52 is made, yield the rigidity, sound reduction, thermal insulation, and weight properties listed above. The floor lift layer 52 is a fiber structure that includes a substrate fiber bound together by a thermoplastic binder fiber. The substrate fiber may include thermoplastic fiber such as polyethylene terephthalate (PET) fiber, polypropylene (PP) fiber, nylon fiber, acrylic fiber, modacrylic fiber, co-polymers thereof, or combinations thereof. The modacrylic fiber may include acrylonitrile, vinylidene dichloride, antimony trioxide, co-polymers thereof, or combinations thereof. Additionally or alternatively, the substrate fiber may include cellulose fiber such as hemp fiber, cotton fiber, and/or paper fiber. The thermoplastic binder fiber may be a bicomponent fiber with, for example, a PP core and a PE sheath surrounding the PP core.

In one example, the floor lift layer 52 includes 48% of short PET fiber by weight, 9% of PP fiber by weight, 3% of nylon by weight, 30% of binder fiber by weight, and 10% of long PET fiber by weight. In other examples, the percentages by weight of the short PET fiber, the PP fiber, the nylon fiber, and the long PET fiber may be within a range of +/−5%, +/−10%, or +/−20% relative to the above percentages. The length of the nylon fiber and the PET fiber may be within a range from 2 mm to 20 mm. The length of the short PET fiber may be within a range from 2 millimeters (mm) to 10 mm. The length of the long PET fiber may be within a range from 10 mm to 20 mm.

To manufacture the floor lift layer 52, the various types of fibers discussed above are mixed to form a fiber mixture and passed through a compression-type oven. The oven compresses the fiber mixture while heating the fiber mixture. As the oven heats the fiber mixture, the PE sheath of the bicomponent fiber melts and forms a coating covering most of the fibers in the mixture. After the fiber mixture exits the oven, the fiber mixture is cooled, and the melted PE solidifies and binds the fibers together to form a fiber structure. The fiber structure may be cut into fiber panels having various sizes, such as 2 feet (ft.) by 3 ft., 3 ft. by 5 ft., or 4 ft. by 6 ft., and the fiber panels may be installed with their ends abutting one another to form the floor lift layer 52. The floor lift layer 52 can be floated, stapled, or glued under floating floor coverings.

To ensure that the floor lift layer 52 has a density within the density range discussed above, the percentages by weight of short PET fiber and binder fiber in the floor lift layer 52 are greater than those of fiber structures that are less dense, such a fiber underlayment. In addition, the amount of compression applied by the oven when making the floor lift layer 52 is greater than the amount of compression applied by the oven when making less dense fiber structures. This may be accomplished by mixing together a greater amount of fiber than is mixed to make less dense fiber structures, and passing the fiber mixture through the oven at a desired minimal thickness. In one example, the amount of fiber used to make the floor lift layer 52 is within a range from 40% to 60% greater than the amount of fiber used to make less dense fiber structures.

Figure 4:
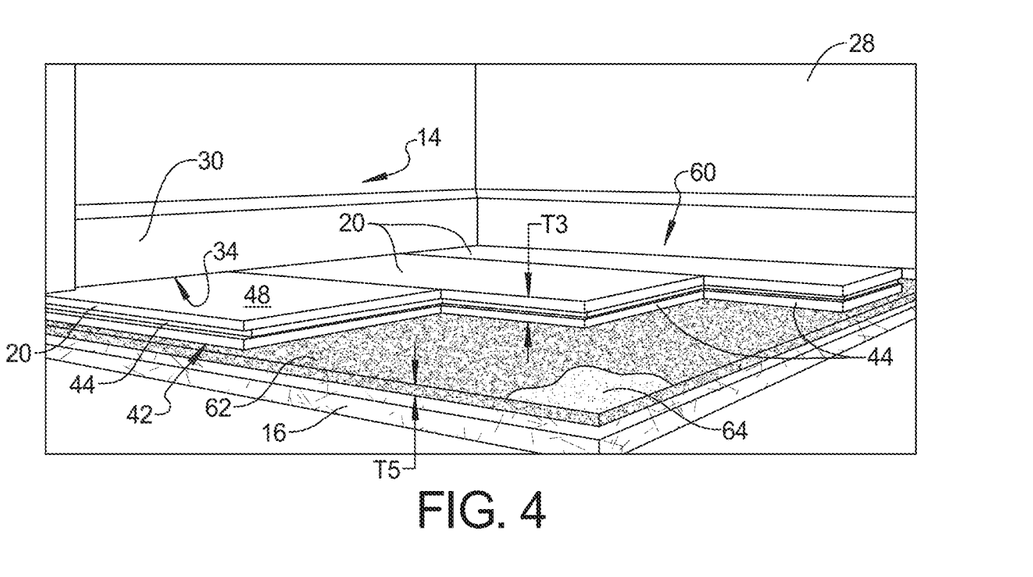
FIG. 4 is a partially sectioned perspective view of a floor structure according to the principles of the present disclosure including the thin floor covering with the backing of FIG. 2 and a floor lift layer that raises the floor covering to eliminate a gap between wall trim and the floor structure, the floor lift layer including a fiber board and a thermal radiant barrier.

Referring now to FIG. 4, another floor structure 60 according to the present disclosure is shown adjacent to the wall structure 14. The floor structure 60 includes the subfloor 16, and the floor covering 42 disposed above the subfloor 16, and a floor lift layer 62 disposed between the subfloor 16 and the floor covering 42. The floor lift layer 62 raises the height of the planks 20 of the floor covering 42 so that the trim 30 seats flush on the floor covering 42 of the floor structure 60 with little to no gap between the top surface 48 of the floor covering 42 and the bottom surface 34 of the trim 30.

The floor lift layer 62 has a thickness T5, which may be within a range from ⅛ in. to ½ in. The sum of the thickness T5 of the floor lift layer 62 and the thickness T3 of the floor covering 42 is equal to the thickness T2 of the floor covering 22 of FIG. 3. Thus, the side surface 26 of the floor covering 22 is not exposed and, in contrast to the floor structure 40 of FIG. 2, the floor structure 60 does not create a trip hazard.

The thickness T5 of the floor lift layer 62 is less than the thickness T4 of the floor lift layer 52 of FIG. 3. The difference between the thickness T5 of the floor lift layer 62 and the thickness T4 of the floor lift layer 52 is equal to the thickness of the backing 44 attached to the underside surfaces of the planks 20. All other properties of the floor lift layer 62 may be similar or identical to those of the floor lift layer 52. For example, the density, compression resistance, IIC, STC, delta-IIC, and/or R-value of the floor lift layer 62 may be within the ranges discussed above in connection with floor lift layer 52.

In addition, the floor lift layer 62 may be made from the same types of fiber materials as the fiber material types from which the floor lift layer 52 may be made. Furthermore, the percentages of each type of fiber used to make the floor lift layer 62 may be within the same ranges as the fiber percentages discussed above in connection with the floor lift layer 52. Moreover, the floor lift layer 62 may be made in the same way as the floor lift layer 52, including using a large amount of fiber per unit thickness to increase the amount of compression applied to the fiber mixture by the oven.

In various implementations, the floor lift layers 52, 62 may have a fire rating of Class C or better. Preferably, the floor lift layers 52, 62 may have a fire rating of Class A or better. For example, the floor lift layers 52, 62 may achieve a Class A fire rating in an ASTM Extended E84 burn test.

To accomplish desired fire rating, at least a portion of the substrate fibers and/or the thermoplastic binder fibers may be treated with a fire-retardant coating. In one example, the fire-retardant coating is applied to about 20% of the substrate fibers after raw material is broken down (e.g., ground) to form the substrate fibers and before the substrate fibers are used to form the floor lift layers 52, 62. The fire-retardant coating may be a liquid coating having fire-retardant characteristics. Such fiber-retardant coatings are available from M-Fire Suppression.

In another example, the substrate fibers may be treated with a fire-retardant coating before raw material is broken down to form the substrate fibers. For example, the substrate fibers may be formed of paper treated (e.g., coated) with a fire retardant. In this example, the fiber-retardant paper may be ground to form the substrate fibers.

Instead of or in addition to treating the substrate fibers with a fire-retardant coating, the substrate fiber may be made from a fiber that is a natural fire retardant. Fibers that are a natural fire retardant may include a hemp fiber, an acrylic fiber, a modacrylic fiber, or a similar type of fiber. In one example, such a modacrylic fiber is available from Kaneka Corporation (sold under the product name Protex®).

In another example, the floor lift layers 52, 62 may include a thermal radiant barrier 64 attached to the top and/or bottom surface(s) of the floor lift layers 52, 62. The thermal radiant barrier 64 may be attached to the floor lift layer 62 using, for example, an adhesive. Although FIG. 4 shows the thermal radiant barrier 64 covering only part of the top surface of the floor lift layer 62, the thermal radiant barrier 64 may cover the entire top and/or bottom surface(s) of either of the floor lift layers 52, 62.

In the examples of FIGS. 3 and 4, the floor lift layers 52, 62 are used with a replacement floor covering that is thinner than the original floor covering, and the floor lift layers 52, 62 raise the height of the floor covering to avoid a gap between the top surface of the floor covering and the bottom surface of the trim. In other examples, the floor lift layer 52, 62 may simply be used for their rigidity, sound reduction, thermal insulation, and/or lightweight characteristics, without raising the height of a floor covering relative to its previous installed height. Thus, the floor lift layers 52, 62 may simply be referred to as fiber boards. Also, the fiber boards 52, 62 may be used in building structures other than floor structures, such as a wall or ceiling structure.

Figure 5:
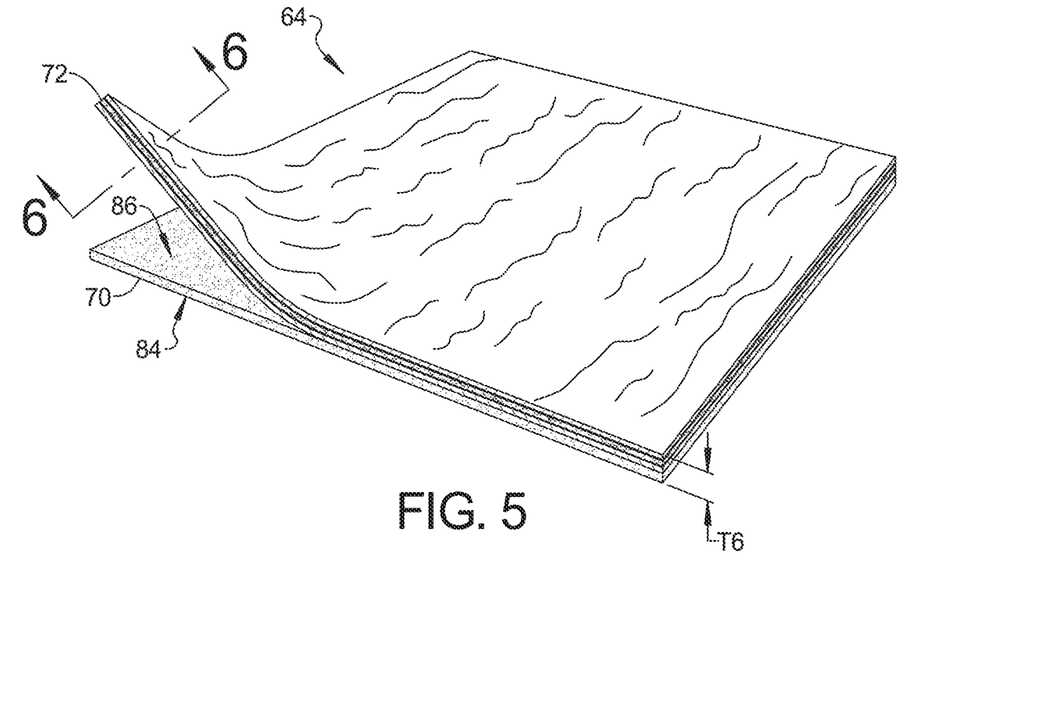
FIG. 5 is a perspective view of the thermal radiant barrier of FIG. 4 including a foam layer and a radiant barrier layer.

With reference to FIG. 5, the thermal radiant barrier 64 has a thickness T6 that may be within a range from 1 mil to 5 mils (e.g., greater than or equal to about 1 mil, optionally greater than or equal to about 2 mil, optionally greater than or equal to about 3 mil, optionally greater than or equal to about 4 mil, less than or equal to about 5 mil, optionally less than or equal to about 4 mil, optionally less than or equal to about 3 mil, or optionally less than or equal to about 2 mil). The thermal radiant barrier 64 includes a first or foam layer 70 and a second or radiant barrier layer 72 disposed on the foam layer 70. The foam layer 70 may include PE, EVA, co-polymers thereof, or combinations thereof. In one example, the foam layer has a weight of about 35 GSM.

Figure 6:
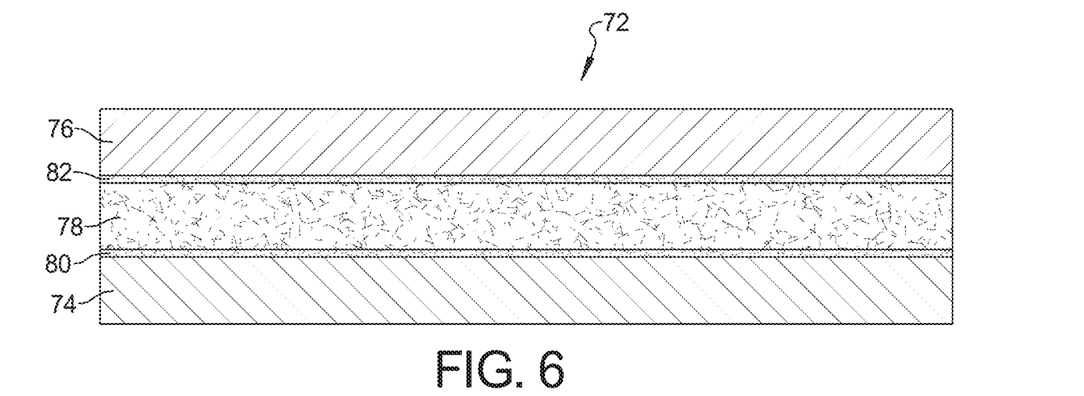
FIG. 6 is a cross-sectional view of the radiant barrier layer of FIG. 5 taken along line 6-6 of FIG. 5.

With additional reference to FIG. 6, the radiant barrier layer 72 includes a first metallic layer 74, a second metallic layer 76, a fiber layer 78, a first adhesive layer 80, and a second adhesive layer 82. The first metallic layer 74 may be disposed directly on the foam layer 70. The first adhesive layer 80 is disposed directly on the first metallic layer 74. The fiber layer 78 is disposed directly on the first adhesive layer 80. The second adhesive layer 82 is disposed directly on the fiber layer 78. The second metallic layer 76 is disposed directly on the second adhesive layer 82. In this way, the fiber layer 78 is positioned between the first metallic layer 74 and the second metallic layer 76, and the fiber layer 78 is separated from the first and second metallic layers 74 and 76 by the first and second adhesive layers 80 and 82, respectively.

The first and second metallic layers 74 and 76 include a metal such as aluminum, gold, tin, silver, copper, stainless steel, lead, alloys thereof, and/or combinations thereof. Preferably, the first and second metallic layers 74 and 76 include aluminum (e.g., the first and second metallic layers 74 and 76 are an aluminum foil). Each of the first and second metallic layers 74 and 76 have a weight within a range of 15 GSM to 20 GSM (e.g., 17.5 GSM).

The fiber layer 78 includes woven fibers. The fibers may include thermoplastic fiber such as a polyethylene terephthalate (PET) fiber, a polypropylene (PP) fiber, a polyethylene fiber (PE), a nylon fiber, an acrylic fiber, a modacrylic fiber, co-polymers thereof, or combinations thereof. The fibers may include fibers such as a hemp fiber, a rayon fiber, a cotton fiber, a natural fiber, a banana plant leaf fiber, or combinations thereof. In various implementations the fibers are coated with PE. The fiber layer 78 may have a weight within a range of 40 GSM to 70 GSM (e.g., 55 GSM).

The first adhesive layer 80 and the second adhesive layer 82 cooperate to attach the first metallic layer 74 to the fiber layer 78 and the second metallic layer 76 to the fiber layer 78, respectively. The first adhesive layer 80 and the second adhesive layer 82 may include PE. Alternatively, any other adhesive materials capable of bonding the top and bottom surfaces of the fiber layer 78 to the first and second metallic layers 74 and 76 may be used. Each of the first adhesive layer 80 and the second adhesive layer 82 may have a weight within a range of 10 GSM to 30 GSM (e.g., 20 GSM).

With continued reference to FIG. 5, the foam layer 70 has a first surface 84 and a second surface 86 opposite of the first surface 84. The first surface 84 is disposed on all or a portion of the top surface of the fiber board 62. It is contemplated that the first surface 84 is disposed directly on all or a portion of the top surface of the fiber board 62. Alternately, adhesive may be disposed between the foam layer 70 and the fiber board 62 to attach the thermal radiant barrier 64 to the fiber board 62.

The radiant barrier layer 72 is disposed directly on all or a portion of the second surface 86. In various implementations, the thermal radiant barrier 64 is heated prior to assembly onto the fiber board 62. When the thermal radiant barrier 64 is heated, at least a portion of the foam layer 70 melts so that the foam layer 70 adheres to the fiber board 62 and/or the radiant barrier layer 72. In this way, the foam layer 70 is configured to be an adhesive.

As discussed above, adhesive may be used to attach the thermal radiant barrier 64 to the fiber board 62. The adhesive may be a high viscosity, low melting point adhesive that is applied hot and forms a bond as it cools (i.e., a "hot melt" adhesive). The adhesive may have a weight within a range of 20 GSM to 40 GSM (e.g., 34 GSM). Such adhesives are available from H.B. Fuller, from Swift Adhesive, and from Western Adhesive (the Western Adhesive product is sold under the product name of RHM542.) Alternatively, any other adhesive capable of bonding the thermal radiant barrier 64 to the fiber board 62 may be used. Although the thermal radiant barrier 64 is only shown in FIG. 4, the thermal radiant barrier 64 may be attached to top and/or bottom surface(s) the fiber board 52 of FIG. 3 in the same way.

In addition to achieving a desired fire rating of the fiber boards 52, 62, the thermal radiant barrier 64 may inhibit or prevent moisture from travelling through the fiber boards 52, 62 and/or to the subfloor 16. In various implementations, each fiber board 52, 62 with the thermal radiant barrier 64 attached thereto may have a permeability rating of less than 0.1 when tested, for example, according to ASTM E96 Standard Test Methods for Water Vapor Transmission of Materials. Therefore, each fiber board 52, 62 with the thermal radiant barrier 64 attached thereto may be a Class 1 vapor barrier.

Figure 7:
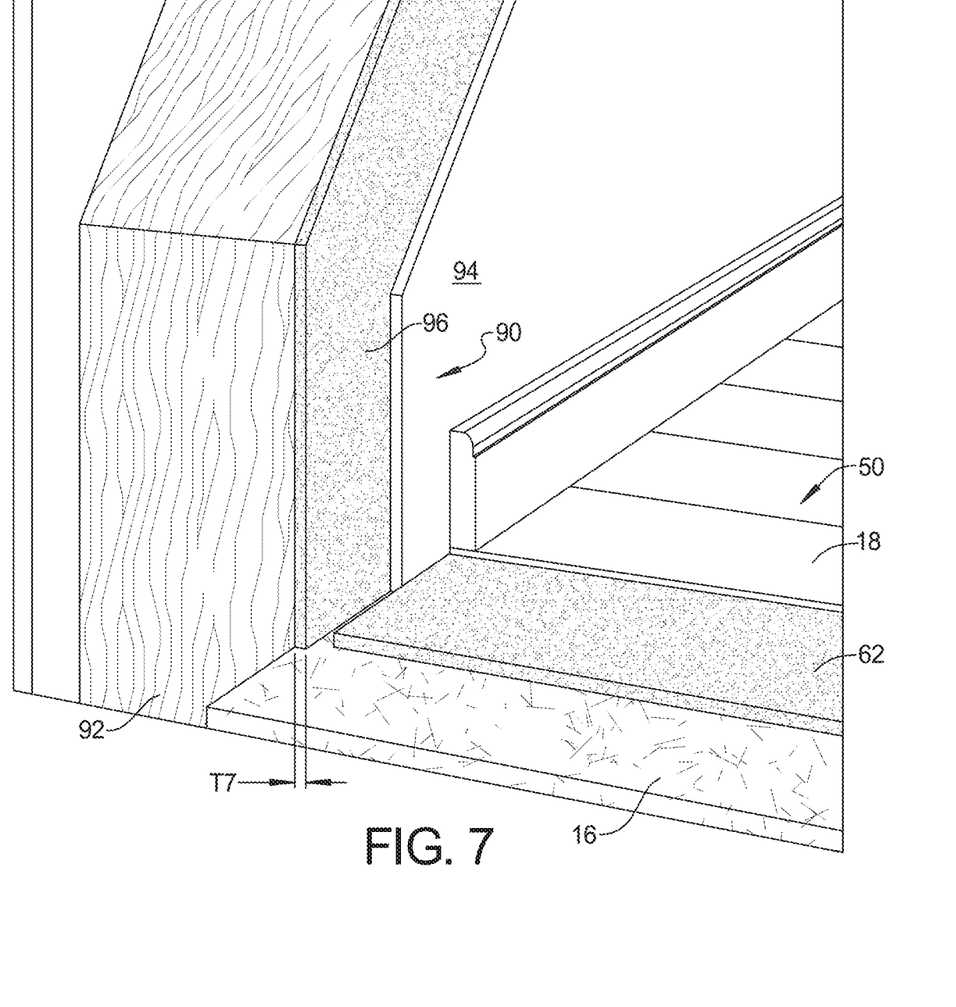
FIG. 7 is a partially sectioned perspective view of a ceiling and wall structure according to the principles of the present disclosure including a fiber board.

Referring to FIG. 7, a wall structure 90 according to the present disclosure is shown adjacent to the floor structure 50. The floor structure 50 includes the subfloor 16, the floor covering 18 disposed above the subfloor 16, and the fiber board 62 disposed between the subfloor 16 and the floor covering 18. Alternately, the floor structure 50 may include the fiber board 52 in place of the fiber board 62. The wall structure 90 includes an insulation layer 92, a wall covering (e.g., drywall) 94 disposed on an interior side of the insulation layer 92, and a fiber board 96 disposed between the insulation layer 92 and the wall covering 94.

The fiber board 96 has a thickness T7, which may be within a range from ⅛ in. to ½ in. The density of the fiber board 96 may be at the lower end of the density range of either of either of the fiber boards 52, 62. For example, the fiber board 96 may a thickness of ½ in. and a weight from 1700 GSM to 2300 GSM. In another example, the fiber board 96 may a thickness of ¼ in. and a weight from 2300 GSM to 2500 GSM. All other properties of the fiber board 96 may be similar or identical to those of the fiber boards 52, 62. For example, the IIC, STC, delta-IIC, and/or R-value of the fiber board 96 may be within the ranges discussed above in connection with the fiber board 52 and/or the fiber board 62.

In addition, the fiber board 96 may be made from the same types of fiber materials as the fiber material types from which the fiber boards 52, 62 may be made. Furthermore, the percentages of each type of fiber used to make the fiber board 96 may be within the same ranges as the fiber percentages discussed above in connection with the fiber boards 52, 62. Moreover, the fiber board 96 may be made in the same way as the fiber boards 52, 62, including using a large amount of fiber per unit thickness to increase the amount of compression applied to the fiber mixture by the oven. The fiber board 96 may achieve a Class A fire rating by, for example, including the naturally fire-resistant fibers, fiber-retardant coated fibers, and/or thermal radiant barrier 64 discussed above in connection with fiber boards 52, 62.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Although each of the embodiments is described above as having certain features, any one or more of those features described with respect to any one embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A wall structure comprising:
  an insulation;
  a wall covering disposed on an interior side of the insulation; and
  a fiber board disposed between the insulation and the wall covering, the fiber board having at least one of (i) an interior surface exposed to the wall covering and (ii) an exterior surface exposed to the insulation, wherein the fiber board is a fiber structure that consists of a substrate fiber and a thermoplastic binder fiber, the substrate fiber being bound together by the thermoplastic binder fiber, wherein the thermoplastic binder fiber makes up between 25 percent (%) and 35% by weight of the fiber board.

2. The wall structure of claim 1 wherein the substrate fiber includes polyethylene terephthalate (PET) fiber, polypropylene (PP) fiber, nylon fiber, paper fiber, or combinations thereof.

3. The wall structure of claim 1 wherein the substrate fiber includes short PET fiber having a length within a range from 2 millimeters (mm) to 10 mm and long PET fiber having a length within a range from 10 mm to 20 mm.

4. The wall structure of claim 3 wherein the substrate fiber further includes polypropylene fiber and nylon fiber.

5. The wall structure of claim 3 wherein the substrate fiber includes between 43% and 53% by weight of the short PET fiber.

6. The wall structure of claim 1 wherein the thermoplastic binder fiber is a bicomponent fiber with a polypropylene core and a polyethylene sheath surrounding the polypropylene core.

7. The wall structure of claim 1 further comprising a thermal radiant barrier attached to a surface of the fiber structure.

8. The wall structure of claim 7 wherein the thermal radiant barrier includes a foam layer disposed on the surface of the fiber structure and a radiant barrier layer disposed on the foam layer, wherein the radiant barrier layer includes a first metallic layer, a second metallic layer, and a fiber layer disposed between the first metallic layer and the second metallic layer.

9. The wall structure of claim 8, wherein:
the foam layer includes at least one of polyethylene (PE), ethylene-vinyl acetate (EVA), co-polymers thereof, or combinations thereof;
each of the first and second metallic layers includes aluminum; and
the fiber layer includes woven fibers that are coated with PE.

10. The wall structure of claim 1 wherein at least one of:
at least a portion of at least one of the substrate fiber and the thermoplastic binder fiber is treated with a fire-retardant coating; and
at least a portion of the substrate fiber includes fiber that is naturally a fire retardant.

11. The wall structure of claim 1 wherein the interior surface of the fiber board is exposed to the wall covering and the exterior surface of the fiber board is exposed to the insulation.

12. A fiber board for a building structure, the fiber board comprising:
a fiber structure that consists of a substrate fiber and a thermoplastic binder fiber, the substrate fiber being bound together by the thermoplastic binder fiber; and
a thermal radiant barrier disposed on a surface of the fiber structure, the thermal radiant barrier including a foam layer disposed on the surface of the fiber structure and a radiant barrier layer disposed on the foam layer, wherein the radiant barrier layer comprises a first metallic layer, a second metallic layer, and a fiber layer disposed between the first metallic layer and the second metallic layer.

13. The fiber board of claim 12 wherein the foam layer includes at least one of polyethylene (PE), ethylene-vinyl acetate (EVA), co-polymers thereof, or combinations thereof.

14. The fiber board of claim 12 wherein the radiant barrier layer further comprises a first adhesive layer disposed between the first metallic layer and the fiber layer and a second adhesive layer disposed between the fiber layer and the second metallic layer.

15. The fiber board of claim 12, wherein each of the first and second metallic layers includes aluminum.

16. The fiber board of claim 12, wherein the fibers of the fiber layer are woven.

17. The fiber board of claim 12, wherein fibers of the fiber layer include polymeric material, hemp, rayon, cotton, natural fibers, banana plant leaf, or combinations thereof, and the fibers are coated with PE.

18. A fiber board for a building structure, the fiber board comprising:
a fiber structure that consists of a substrate fiber and a thermoplastic binder fiber, the substrate fiber being bound together by the thermoplastic binder fiber, wherein the thermoplastic binder fiber makes up between 25 percent (%) and 35% by weight of the fiber board; and
a fire-retardant coating applied to at least one of the substrate fiber and the thermoplastic binder fiber, wherein the substrate fiber is made of a first material and the fire-retardant coating is made of a second material that is different than the first material.

19. The fiber board of claim 18, wherein the fire-retardant coating is applied in a liquid state to at least one of the substrate fiber and the thermoplastic binder fiber.

20. The fiber board of claim 18, wherein the fire-retardant coating is applied to the substrate fiber after a raw material is broken down to form the substrate fiber and before the substrate fiber is bound together by the thermoplastic binder fiber to form the fiber board.

21. The fiber board of claim 18, wherein the fire-retardant coating is applied to a raw material, and then the raw material is broken down to form the substrate fiber.

* * * * *